United States Patent
Mori et al.

(10) Patent No.: US 6,837,817 B2
(45) Date of Patent: Jan. 4, 2005

(54) VEHICLE FRONT AND REAR WHEELS DRIVE SYSTEM AND CLUTCH CHANGEOVER METHOD

(75) Inventors: Atsushi Mori, Saitama (JP); Yasuji Shibahata, Saitama (JP); Takehiko Furuya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/720,168

(22) Filed: Nov. 25, 2003

(65) Prior Publication Data

US 2004/0106487 A1 Jun. 3, 2004

Related U.S. Application Data

(62) Division of application No. 10/237,122, filed on Sep. 9, 2002, now Pat. No. 6,790,152.

(30) Foreign Application Priority Data

Sep. 11, 2001 (JP) .................................... P. 2001-274729
Sep. 11, 2001 (JP) .................................... P. 2001-274730

(51) Int. Cl.$^7$ ............................................... F16H 67/04
(52) U.S. Cl. ...................... 475/142; 475/327; 475/140; 192/16
(58) Field of Search ................................ 475/140, 142, 475/264, 265, 327; 192/13 A, 14, 16, 18 A, 18 B, 18 R, 48.91, 87.16

(56) References Cited

U.S. PATENT DOCUMENTS

| | | | | |
|---|---|---|---|---|
| 2,870,655 A | * | 1/1959 | Rockwell ..................... | 475/142 |
| 2,998,872 A | * | 9/1961 | Sommer et al. .......... | 192/18 A |
| 3,020,990 A | * | 2/1962 | Liu ............................ | 475/142 |
| 3,696,898 A | * | 10/1972 | Sommer .................... | 192/18 A |
| 4,688,664 A | * | 8/1987 | Miller ....................... | 192/18 A |
| 5,462,147 A | * | 10/1995 | Sherman .................... | 192/18 A |

FOREIGN PATENT DOCUMENTS

| EP | 0314639 | * | 5/1989 |
|---|---|---|---|
| JP | 7-64219 | | 7/1995 |

* cited by examiner

Primary Examiner—Ha Ho
(74) Attorney, Agent, or Firm—Westerman, Hattori, Daniels & Adrian, LLP (57) ABSTRACT

Changeover clutch discs for a direct coupling clutch and a change-speed clutch, respectively, are disposed in two stages in a radial direction across a movable element which can move in axial directions of an input shaft. A carrier and the movable element are brought into meshing engagement with each other such that the movable element does not rotate relative to the carrier. The changeover clutch discs mesh with clutch discs which are disposed on the input shaft and a casing, respectively. A coned disc spring and an electromagnetic actuator are disposed such that operating directions of the spring and the actuator are opposed to each other. The coned disc spring keeps the direct coupling clutch in normally engaged condition with its biasing force, and the electromagnetic actuator brings a change-speed clutch into engagement after it has released the engagement of the direct coupling clutch by virtue of its thrust.

4 Claims, 8 Drawing Sheets

VEHICLE FRONT AND REAR WHEELS DRIVE SYSTEM AND CLUTCH CHANGEOVER METHOD

This application is a divisional of application Ser. No. 10/237,122 filed Sep. 9, 2002 now U.S. Pat. No. 6,790,152.

BACKGROUND OF THE INVENTION

1. Field of the Invention

The present invention relates to a vehicle front and rear wheels drive system and a clutch changeover method.

2. Description of the Related Art

In conventional four-wheel drive vehicles (hereinafter, referred to as "4WD vehicles"), when turning a corner having a small turning radius at low to intermediate speeds in four-wheel drive running conditions, there occurs a tight corner braking phenomenon due to the generation of a turning speed difference between front and rear wheels attributed to a difference in turning radius. Generally known as a technology for solving the problem of the tight corner braking phenomenon is a front and rear wheels drive system such as disclosed in JP-B-7-64219. The front and rear wheels drive system so disclosed is such that the average wheel speed of the secondary drive wheels is adjusted relative to the average wheel speed of the primary drive wheels by providing a change-speed apparatus between the primary drive wheels and the secondary drive wheels. Specifically speaking, this change-speed apparatus is designed to change over a direct coupled state in which the average wheel speed of the primary drive wheels and the average wheel speed of the secondary drive wheels are substantially equal and a speed increased state in which the average wheel speed of the secondary drive wheels becomes faster than the average wheel speed of the primary drive wheels by switching ON and OFF a direct coupling clutch and a change-speed clutch. Thus, according to the front and rear wheels drive system so constructed, when turning a tight corner in the four-wheel drive running conditions, the occurrence of the tight corner braking phenomenon is prevented by putting the secondary-drive wheels in the speed increased state using the change-speed apparatus.

In the change-speed apparatus of the front and rear wheels drive system, since at least two hydraulic or electromagnetic actuators are needed as a power source for operating the direct coupling clutch and the change-speed clutch, there is caused a defect that the size and weight of the apparatus are increased.

SUMMARY OF THE INVENTION

Then, an object of the invention is to provide a vehicle front and rear wheels drive system and a clutch changeover method which can enable the changeover of a change-speed apparatus in the vehicle front and rear wheels drive system using a single actuator to thereby reduce the overall size and weight of the change-speed apparatus.

With a view to attaining the object, according to a first aspect of the invention, there is provided a vehicle front and rear wheels drive system having along a power transmission path extending from primary drive wheels to secondary drive wheels a speed-changeable change-speed apparatus having a composite planetary gear device provided in a casing fixed to a vehicle body, the vehicle front and rear wheels drive system being characterized in that changeover clutch discs for, respectively, a direct coupling clutch and a change-speed clutch are disposed on a movable element provided concentrically with an input shaft or an output shaft of the change-speed apparatus to which power is transmitted from the primary drive wheels, adapted to move along the direction of the input shaft or the output shaft and meshing with a carrier of the composite planetary gear device in such a manner as not to rotate relative to the carrier, in that an elastic body and an actuator both for changing over the state of the direct coupling clutch or said change-speed clutch between engagement and disengagement are disposed such that operating directions of the elastic body and the actuator are opposed to each other in the direction of the input shaft or the output shaft, in that the elastic body brings one of the direct coupling clutch and the change-speed clutch into engagement by moving the movable element by virtue of a biasing force thereof, and in that after having released the engagement of the one clutch by moving the movable element against the biasing force of the elastic body by virtue of the thrust thereof, the actuator brings the other clutch into engagement.

Here, the "primary drive wheels" means drive wheels to which power is directly transmitted from a power source, while the "secondary drive wheels" means drive wheels to which power from the power source is transmitted via torque transmission clutches which can each control the torque transmission amount thereof. In addition, the "elastic body" is something like, for example, a coned disc spring, a coil spring, a plate spring, a rubber or the like. Furthermore, it goes without saying that the material of the elastic body may be changed as required by selecting a suitable one from meal, plastic, rubber and the like. Moreover, "concentrically" includes in its meaning the layout configuration of the direct coupling clutch and the change-speed clutch as will be described later.

According to the first aspect of the invention, the direct coupling clutch is kept engaged normally by moving the movable element in one direction by virtue of the biasing force of the elastic body. Then, when the actuator is actuated and the movable element is moved in the other direction against the biasing force of the elastic body by virtue of the thrust thereof the engagement of the direct coupling clutch is released. Thereafter, when the movable element is moved further in the other direction the change-speed clutch is brought into engagement. In addition, when halting the operation the actuator, since the movable clutch is allowed to move again in the one direction by virtue of the biasing force of the elastic body, the direct coupling clutch is brought into engagement again after the engagement of the changeover disc clutches is released.

According to a second aspect of the invention, there is provided a vehicle front and rear wheels drive system as set forth in the first aspect of the invention, wherein the changeover clutch discs, respectively, for the direct coupling clutch and the change-speed clutch are disposed in two stages in a radial direction across the movable element, and wherein the changeover clutch discs situated on an inner circumferential side engage with clutch discs disposed on either the input shaft or the output shaft, while the changeover clutch discs disposed on an outer circumferential side engage with clutch discs disposed on the casing.

According to the second aspect of the invention, in addition to the function provided in the first aspect of the invention, for example, by moving the movable element in the one direction by virtue of the biasing force of the elastic body the changeover clutch discs disposed on the movable element for the direct coupling clutch are allowed to normally engage with the clutch discs disposed on the input shaft. As this occurs, since the input shaft rotates together with the movable element, the power transmitted from the input shaft is outputted via the carrier of the composite planetary gear apparatus which meshes with the movable element in such a manner as not to rotate relative to the movable element. Then, when the actuator is actuated to move the movable element in the other direction against the biasing force of the elastic body by virtue of the thrust thereof the changeover clutch discs of the direct coupling clutch move apart from the clutch discs disposed on the input shaft, whereby the engagement of the direct coupling clutch is released. Thereafter, when the movable element is moved further in the other direction the changeover clutch discs of the change speed clutch disposed on the movable element are brought into engagement with clutch discs disposed on the casing fixed to the vehicle body, whereby the change-speed clutch is brought into engagement. Thus, the input shaft rotates independently from the movable element, and in addition, the movable element that is then rotating is fixed to the casing in association with the engagement of the change-speed clutch, whereby the rotation of the carrier is halted. As this occurs, the power transmitted from the input shaft is outputted via the respective gears of the composite planetary gear device. Then, when the actuator halts the operation since the movable element moves in the one direction again by virtue of the biasing force of the elastic body, the direct coupling clutch is brought into engagement again after the engagement of the change-speed clutch has been released.

According to a third aspect of the invention, there is provided a clutch changeover method for changing over clutches in a change-speed apparatus having a direct coupling clutch and a change-speed clutch which are disposed on a movable element provided concentrically with an input shaft or an output shaft to which power is transmitted and adapted to move along the direction of the input shaft or the output shaft, and an elastic body and an actuator both for changing over the state of the direct coupling clutch or the change-speed clutch between engagement and disengagement which are disposed such that operating directions of the elastic body and the actuator are opposed to each other in the direction of the input shaft or the output shaft, the clutch changeover method comprising keeping one of the direct coupling clutch and the change-speed clutch in engagement by normally moving the movable element in one direction by virtue of a biasing force of the elastic body, and by actuating the actuator, after having released the engagement of the one clutch by moving the movable element against the biasing force of the elastic body by virtue of the thrust of the actuator so actuated, bringing the other clutch into engagement.

According to the third aspect of the invention, for example, the engagement of the direct coupling clutch, which is kept in a normally coupled state by virtue of the biasing force of the elastic body is released via the movable element by actuating the actuator. Thereafter, when the movable element is moved further in the other direction the change-speed clutch is then brought into engagement. In addition, when the operation of the actuator stops in this condition the movable element moves in the one direction by virtue of the biasing force of the elastic body, whereby the engagement of the change-speed clutch is released, and thereafter, the direct coupling clutch is brought into engagement again.

DETAILED DESCRIPTION OF THE PREFERRED EMBODIMENTS

Referring to the accompanying drawings, a vehicle front and rear wheels drive system and a clutch changeover method both according to the invention will be described in detail below. In a first embodiment, as shown in FIG. 1, the invention is applied to a 4WD vehicle which is based upon a front-engine, front-wheel drive (FF) vehicle.

Figure 2:
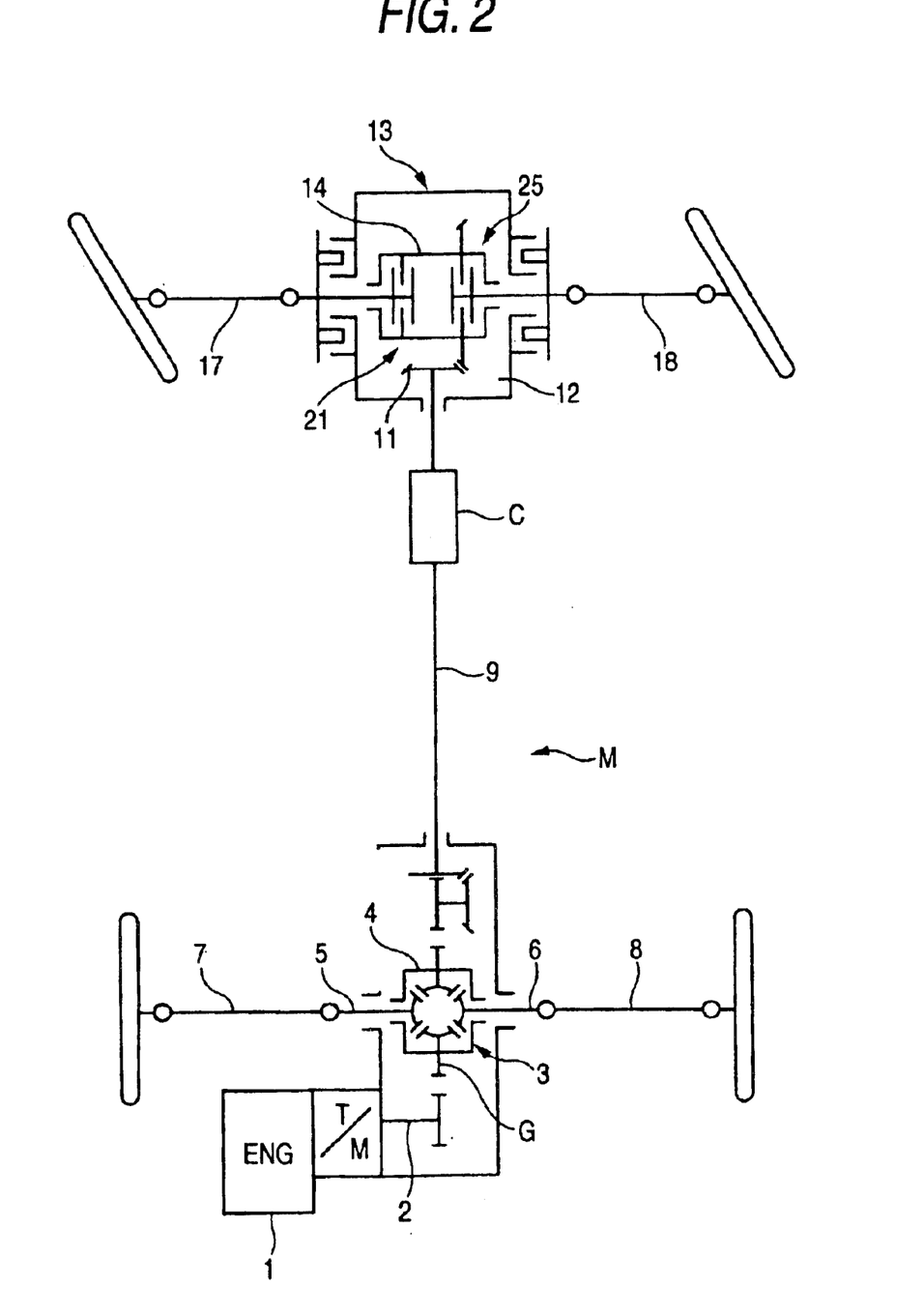
FIG. 2 is a view showing as another example of the invention the construction of a drive train of a 4WD vehicle which is based on a RR vehicle to which the invention is applied.

Note that the invention is not limited to the 4WD based upon the FF vehicle but may be applied to a 4WD which is based upon a rear-engine rear-drive (RR) vehicle as shown in FIG. 2, or a front-engine, rear-wheel drive (FR) vehicle, which is not shown. In addition, a change-speed apparatus of a front and rear wheels drive system according to the invention may be used as a sub transmission of a transmission of an FR vehicle. Here, the construction of a 4WD vehicle based upon an RR vehicle shown in FIG. 2 is such that the construction of an FF vehicle based 4WD vehicle according to the first embodiment is reversed in a longitudinal direction of the vehicle, and therefore, like reference numerals are imparted to like constituent components to the first embodiment.

Figure 1:
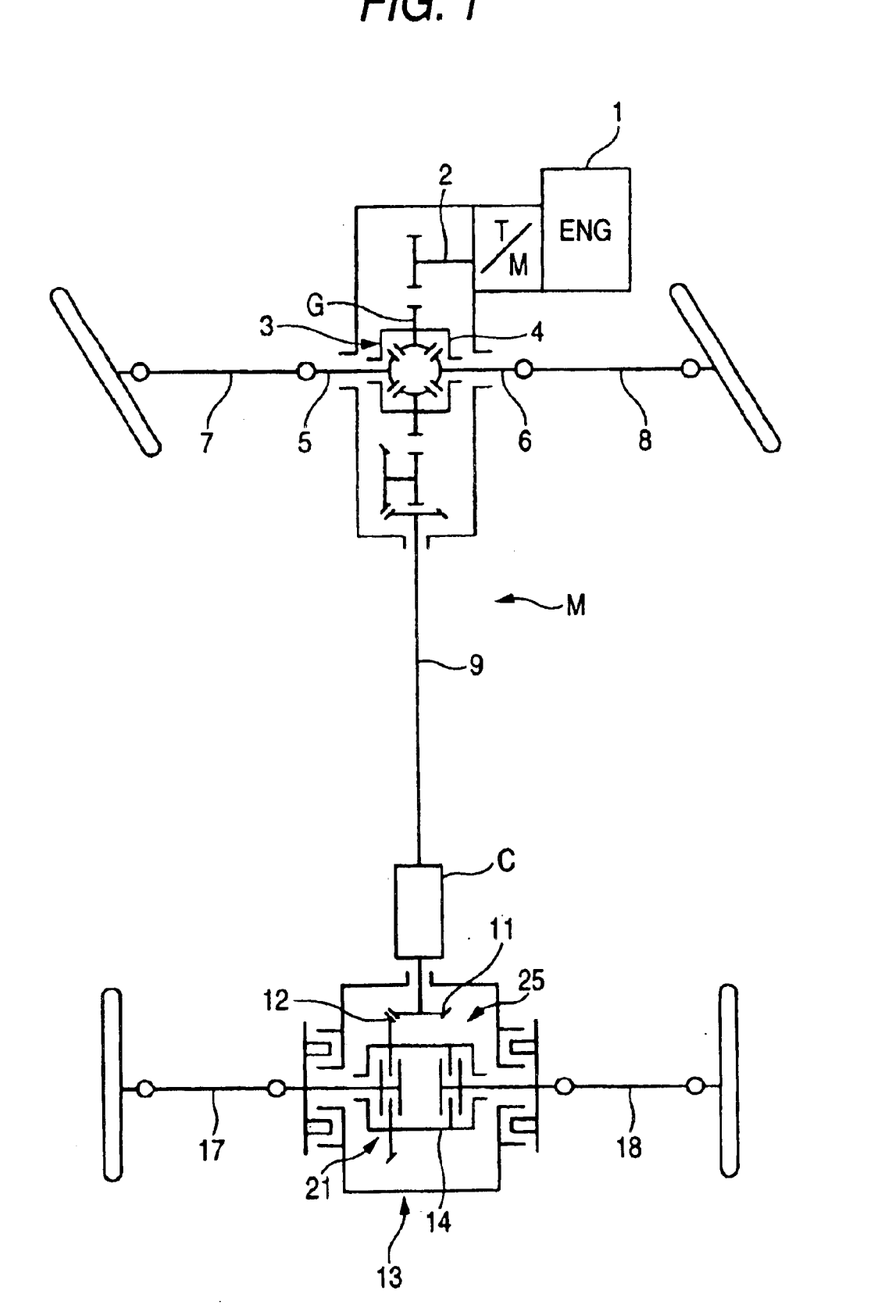
FIG. 1 is a view showing the construction of a drive train of a 4WD vehicle which is based on an FR vehicle to which a vehicle front and rear wheels drive system according to the invention is applied.

As shown in FIG. 1, a vehicle front and rear wheels drive system M according to the first embodiment has a front-wheel (primary drive wheel) side differential 3 to which the power of an engine 1 placed at the front of a vehicle is transmitted from an output shaft 2 of a transmission, a change-speed apparatus C to which the power from the front-wheel side differential 3 is transmitted via a propeller shaft (a power transmission path) 9, and a rear-wheel (secondary drive wheel) side differential 13 to which the power from the change-speed apparatus C is transmitted.

Figure 3:
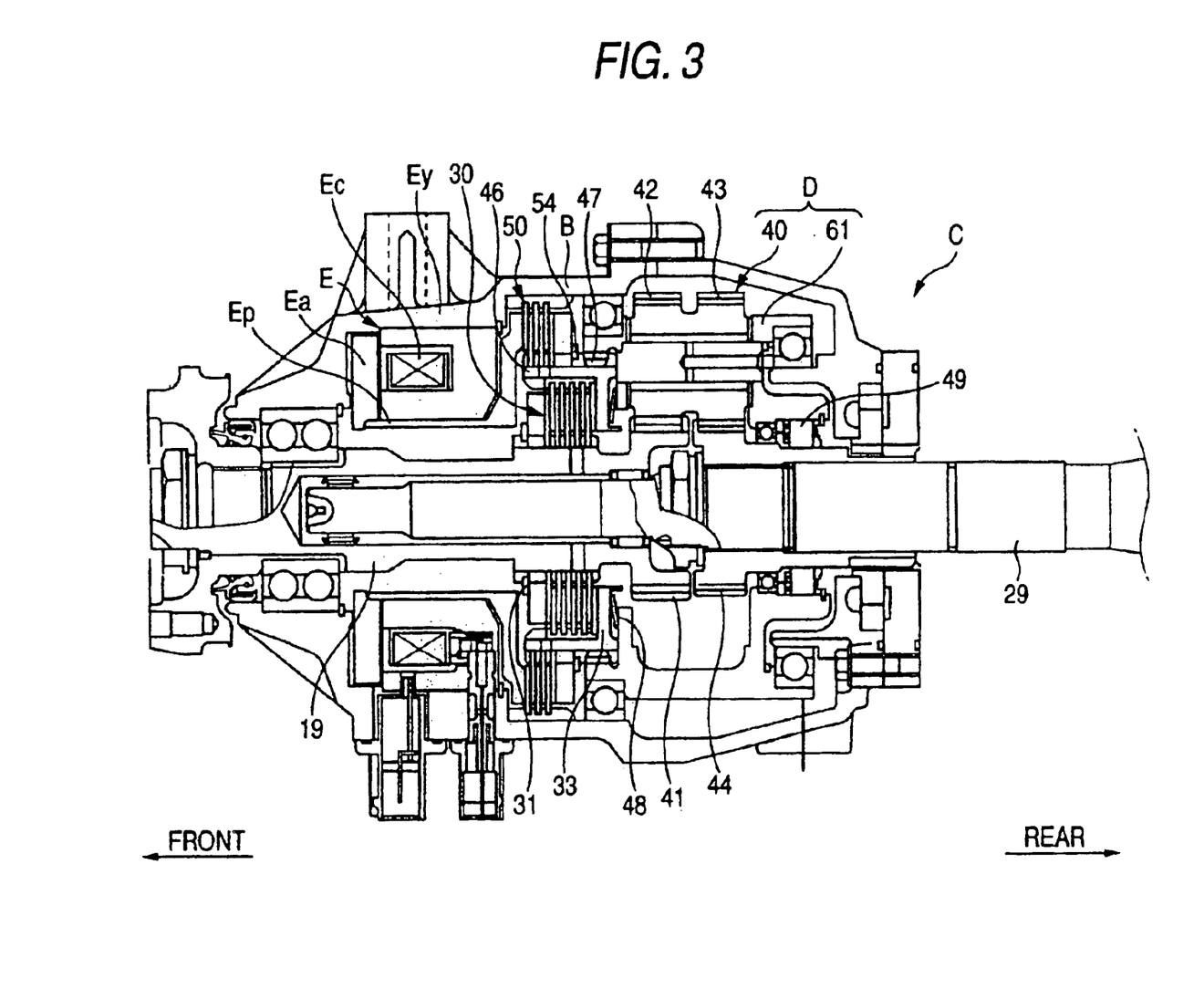
FIG. 3 is a horizontal sectional view showing a change-speed apparatus according to a first embodiment of the invention.

The front-wheel side differential 3 has a conventionally known construction, in which the power from the output shaft 2 of the transmission is transmitted to left and right front drive axles 7, 8 via predetermined individual gears G within a differential case 4 and output shafts 5, 6, whereby respective front wheels are driven. On the other hand, the rear-wheel side differential 13 also has a conventionally known construction, in which the power transmitted via the change-speed apparatus C and gears 11, 12 is controlled by hydraulic multi-plate clutches 21, 25 within a differential case 14 so as to be transmitted to left and right rear drive axles 17, 18, whereby respective rear wheels are variably driven. As shown in FIG. 3, the change-speed apparatus has a casing B fixed to a vehicle body, an input shaft 19 disposed at a position closer to the front of the vehicle within the casing B to which power is transmitted from the front-wheel side differential 3, an output shaft 29 having an axial center which is coaxial with the axial center of the input shaft 19 and disposed rearwards of the input shaft 19, and a composite planetary gear device D disposed in such a manner as to bridge the input shaft and the output shaft 29. These input shaft 19, the output shaft 29 and the composite planetary gear device D are put in a rotatable condition by bearings. The composite planetary gear device D is constituted by a carrier 61 and an increase-speed mechanism 40, and a direct coupling clutch 30, a movable element 46 and a change-speed clutch 50 are provided forward of the planetary gear apparatus D concentrically with the input shaft 19 in that order oriented outwardly from the input shaft 19. An electromagnetic actuator E is provided forward of the change-speed clutch 50. Information on vehicle speeds and steer angles of a steering wheel is inputted in this actuator E as input signals, and the actuator E is controlled so as to be switched on and off based upon these input signals. Then, when electric power is supplied to this electromagnetic actuator E, an exciting coil Ec thereof gets magnetic through energization, and when a magnetic force so generated is then transmitted to a yoke member Ey which is made of a magnetic material an armature Ea is drawn rearwards, whereby a presser portion Ep is pushed rearwards.

Figure 4:
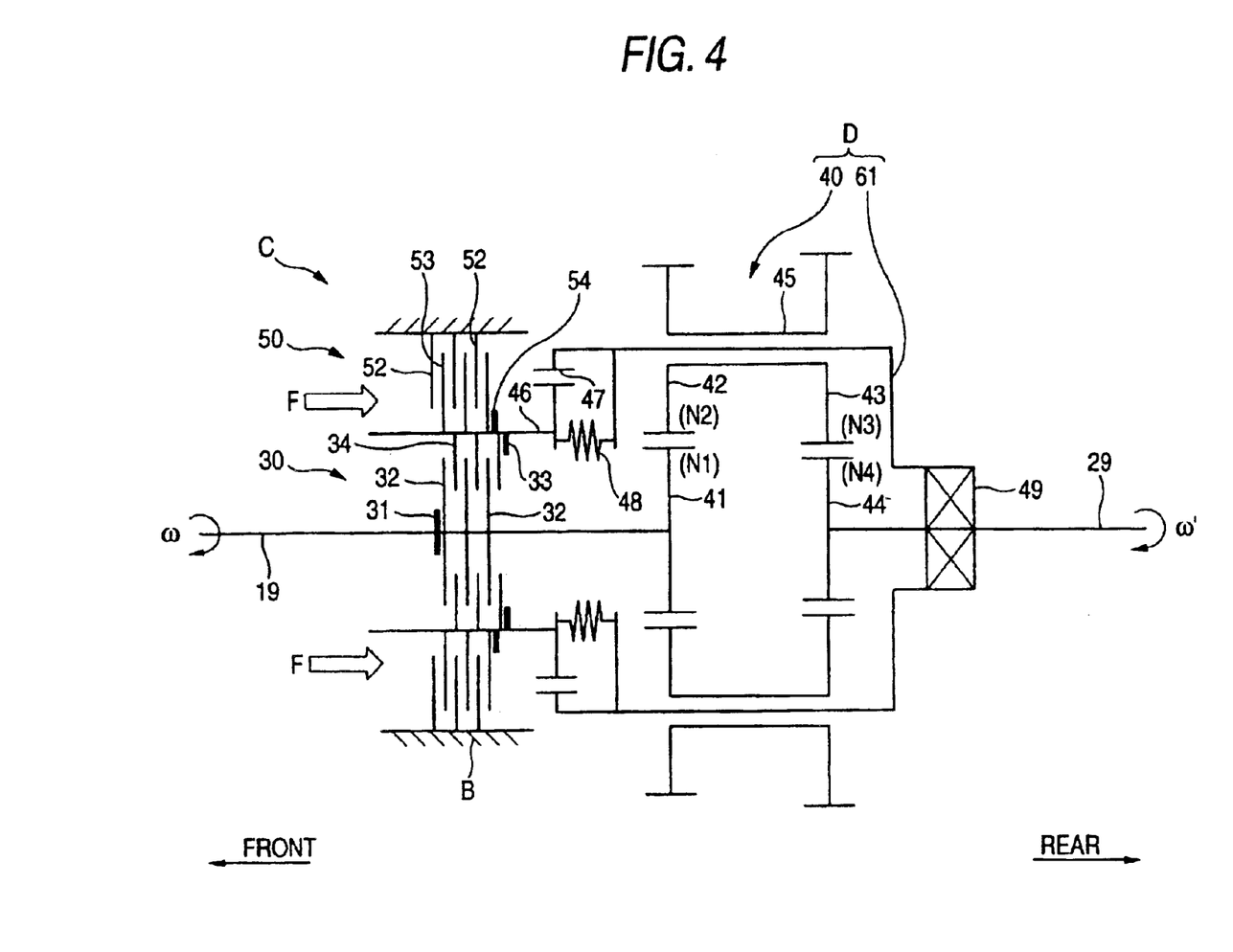
FIG. 4 is a view showing the construction of the change-speed apparatus of the invention in a diagrammatic fashion.

Using FIG. 4 which describes the change-speed apparatus C in a diagrammatic fashion, the change-speed apparatus C continues to be described in detail.

An internal gear 47 is formed in an inner circumference of the carrier 61 of the composite planetary gear device D at a front end thereof, and the increase-speed mechanism 40 is provided at a central portion of the carrier 61. A movable element 46 comprising an annular member having a gear formed therein which meshes with the internal gear 47 in such a manner as not to rotate relative to the internal gear 47 and being a spline-engaged with the input shaft 19 in such a manner as to move along the axial direction of the input shaft 19 is provided at the front end (an input shaft 19 side) of the carrier 61. Then, an annular coned disc spring (an elastic body) is provided between the movable element 46 and the carrier 61, and this coned disc spring 48 biases normally the movable element 46 forward. Furthermore, a one-way clutch 49 is provided between a rear end of the carrier 61 and the output shaft 29, and this one-way clutch 49 is designed such that the one-way clutch is brought into engagement only when the input shaft 19 rotates in such a rotating direction that the vehicle is advanced (hereinafter, referred to as an "advancing" direction) to thereby rotate the output shaft 29 in the advancing direction.

Here, the thrust of the electromagnetic actuator is allowed to act rearwards against the biasing force of the coned disc spring 48 by disposing the coned disc spring 48 and the electromagnetic actuator in such a manner that operating directions thereof are opposed to each other in the axial direction of the input shaft 19.

The direct coupling clutch 30 is a multi-plate clutch comprising clutch discs 32 disposed in such a manner as to be in spline engagement with the input shaft 19 on inner circumferences thereof so as to slide over the input shaft 19 in longitudinal directions and changeover clutch discs 34 disposed in such a manner as to be in spline engagement with the movable element 46 on outer circumferences thereof so as to slide along the movable element 46 in the longitudinal directions. The clutch discs 32 and the changeover clutch discs 34 are disposed alternately in the longitudinal direction, and the longitudinal movements of the clutches are regulated by a circlip 31 fixed to the input shaft 19 and a protruding portion 33 (refer to FIG. 3) which protrudes inwardly from the movable element 46.

The change-speed clutch 50 is a multi-plate clutch comprising change over clutch discs 53 disposed in such a manner as to be in spline engagement with the movable element 46 on inner circumferences thereof so as to slide over the movable element 46 in the longitudinal directions, and clutch discs 52 disposed in such a manner as to be in spline engagement with a casing B on outer circumferences thereof so as to slide along the casing B in the longitudinal directions. The changeover clutches 53 and the clutch discs 52 are disposed alternately in the longitudinal direction. Rearward movements of these changeover clutches 53 and the clutch discs 52 are regulated by a circlip 54 fixed to the movable element 46.

Thus, the respective changeover clutch discs 34, 53 of the direct coupling clutch 30 and the change-speed clutch 50 are disposed in two stages in a radial direction across the movable element 46.

The increase-speed mechanism 40 is a planetary gear mechanism comprising a sun gear 41 fixed to the input shaft 19, a plurality of small pinion gears 42 meshing with the sun gear 41, large pinion gears 43 formed integrally with the respective small pinion gears 42 via connecting rods 45, and a sun gear 44 meshing with the large pinion gear 43 and fixed to the output shaft 29. The respective connecting rods 45 coupling the small pinion gears 42 with the large pinion gears 43 are supported rotatably by the carrier 61.

Here, assuming that the number of teeth of the sun gear 41 is (N1), the number of teeth of the small pinion gear. 42 is (N2), the number of teeth of the large pinion gear 43 is (N3), and the number of the sun gear 44 is (N4), the following relationship will be set.

$$\frac{N1}{N2} \cdot \frac{N3}{N4} > 1.0 \qquad \text{[Expression 1]}$$

Thus, the speed-changeable change-speed apparatus C is provided on the propeller shaft 9 of the 4WD vehicle of the aforesaid type which apparatus has the direct coupling clutch 30, the increase-speed mechanism 40, the change-speed clutch 50, the movable element 46, the one-way clutch 49, the coned disc spring 48 and the electromagnetic actuator E.

Next, the operation (clutch changeover method) of the change-speed apparatus C in the vehicle front and rear wheels drive system M will be described.

With the electromagnetic actuator E of the change-speed apparatus C being switched OFF, since there is generated from the electromagnetic actuator no thrust which is directed to a direction indicated by an arrows F in FIG. 4, no pressure is applied to the change-speed clutch 50 and there is generated no restraining force between the casing B and the movable element 46. On the other hand, a thrust directed forward is imparted to the movable element 46 by the coned disc spring 48 and the movable element 46 moves forward. When the movable element 46 moves forward the projecting portion 33 on the movable element 46 pushes forward the changeover clutch discs 34 and the clutch discs 32 of the direct coupling clutch 30. Since the input shaft 19 receives via the circlip 31 a biasing force transmitted in this way, the direct coupling clutch 30 is switched ON. As this occurs, since the change-speed clutch 50 is released at a front end thereof, there is generated no pressure and the change-speed clutch 50 is switched OFF.

Thus, when the direct coupling clutch 30 is switched ON the movable element 46 is fixed to the input shaft 19, while when the change-speed clutch 50 is switched OFF the movable element 46 becomes unfixed to the casing B, and therefore, the input shaft 19 and the movable element 46 rotate together. In addition, since the movable element 46 and the carrier 61 are prevented from rotating relative to each other by the internal gear 47, they also rotate together. In the event that the rotating direction of the input shaft 19 is in the advancing direction, the clutch of the one-way clutch 49 provided at the rear end of the carrier 61 is brought into engagement, whereby the output shaft 29 rotates. Therefore, in the event that the vehicle is moved forward, since the input shaft 19, the movable element 46, the carrier 61 and the output shaft 26 rotate together, the number of rotations ($\omega'$) of the output shaft 29 becomes equal to the number of rotation ($\omega$) of the input shaft 19. Namely, when the vehicle is advanced the assistance in transmitting the torque from the input shaft 19 to the output shaft 29 is rendered by the movable element 46, the carrier 61 and the one-way clutch 49, the relationship between the numbers of rotations of the shafts becoming $\omega=\omega'$.

Figure 5:
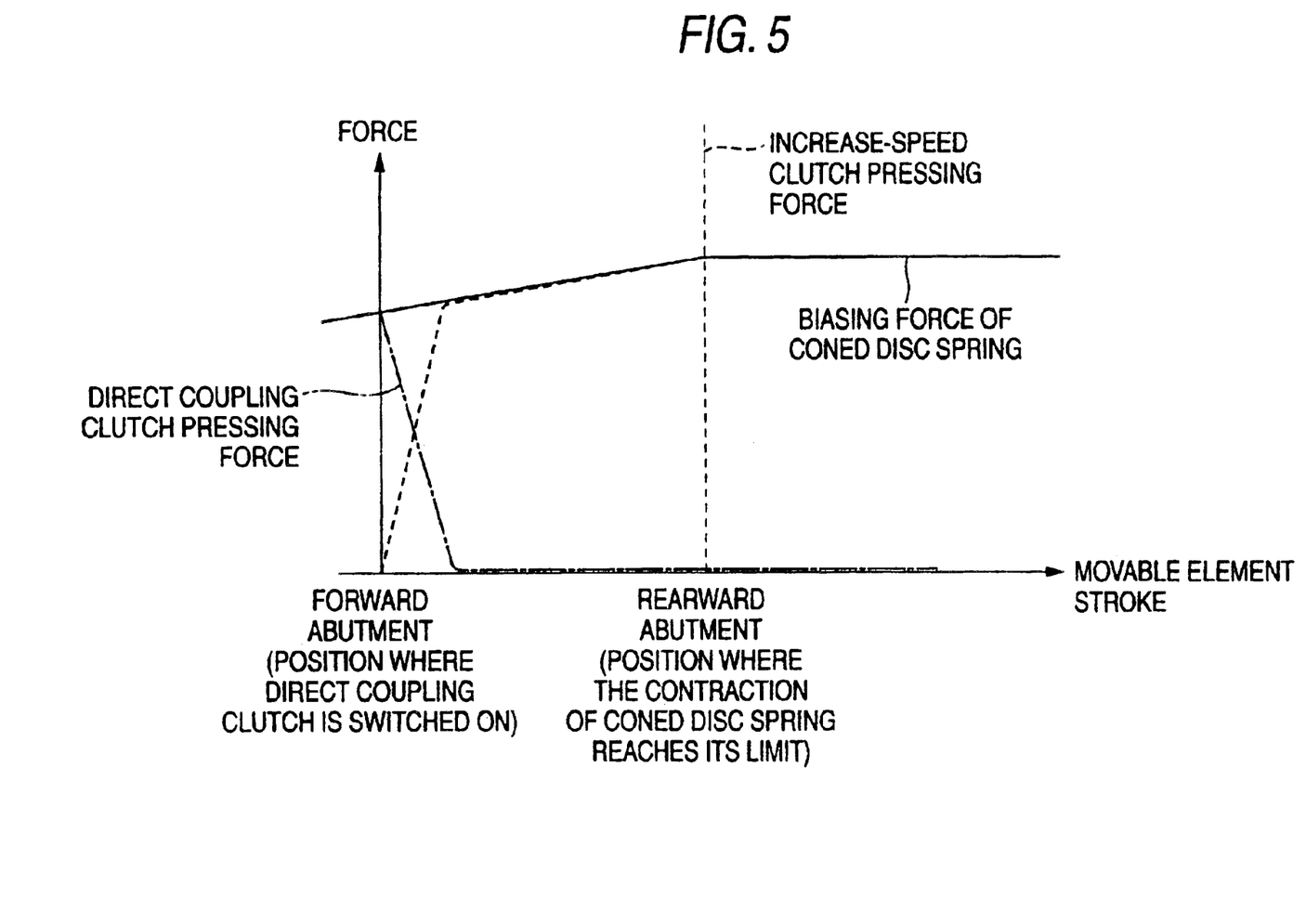
FIG. 5 is a graph showing relationships among a biasing force by a coned disc spring, an increase-speed clutch pressing force and a direct coupling clutch pressing force.

In contrast, with the electromagnetic actuator E being switched ON, since a thrust is generated from the electromagnetic actuator E in a direction indicated by the arrow F in FIG. 4, the clutch discs 52 and the changeover clutch discs 53 of the change-speed clutch 50 are moved rearwards. Since the rearward movements of the clutch discs 52 and the changeover clutch discs 53 are regulated by the circlip 54 of the movable element 46, the clutch discs 52 and the changeover clutch discs 53 are gradually brought into friction engagement with each other. Here, since the respective clutch discs 52 and the changeover clutch discs 53 gradually come into friction engagement with each other due to their movements being restrained by the circlip 54 of the movable element 46, as shown in FIG. 5, as the thrust of the electromagnetic actuator E (hereinafter, referred to as the "pressing force of the change-speed clutch") gets stronger, the biasing force that is being applied to the direct coupling clutch 30 by the coned disc spring 48 starts to be dampened. Due to this, the friction engagement force between the respective clutch discs 52 and changeover clutch discs 53 of the change-speed clutch 50 gets stronger gradually, whereby the friction engagement force between the respective clutch discs 32 and the changeover clutch discs 34 of the direct coupling clutch 30 gets weaker gradually.

Then, when the friction engagement force of the direct coupling clutch 30 becomes nil the pressing portion Ep of the electromagnetic actuator E, while receiving all the biasing force of the coned disc spring 48, moves the movable element 46 rearwards by virtue of the thrust thereof against the biasing force of the coned disc spring 48. When the contraction of the coned disc spring 48 reaches its limit (an upper limit of the biasing force of the coned disc spring 48 is reached) all the pressing force of the change-speed clutch is then applied thereto, whereby the clutch discs 52 and the changeover clutch discs 53 thereof are brought into complete friction engagement with each other. Namely, the change-speed clutch 56 is switched ON, and the movable element 46 is fixed to the casing B. As this occurs, the biasing force of the coned disc spring 48 is received by the change-speed clutch pressing force, and a clearance required for completely releasing the friction engagement between the respective clutch discs 32 and changeover clutch discs 34 of the direct coupling clutch 30 is secured, whereby the direct coupling clutch 30 is switched OFF. Namely, there is generated no restraining force between the movable element 46 and the input shaft 19.

Thus, as the change-speed clutch 50 is gradually brought into friction engagement, the movable element 46 that is then rotating starts to be fixed to the casing B gradually to thereby start to halt the rotation of the carrier 61, and as the friction engagement of the direct coupling clutch 30 is gradually released, the input shaft 19 starts to rotate independently from the movable element 46. Thus, the independent rotation of the input shaft 19 from the movable element 46 transmits gradually the power of the input shaft 19 to the output shaft 29 via the increase-speed mechanism 40. Then, when the thrust of the electromagnetic actuator E reaches the upper limit value of the biasing force of the coned disc spring 48 the change-speed clutch 50 is brought into complete friction engagement, whereby the movable element 46 is completely fixed to the casing B which is fixed to the vehicle body, and the friction engagement of the direct coupling clutch 30 is completely released, the input shaft 19 being allowed to rotate completely independently. As this occurs, the transmission of power is bypassed from the input shaft to the output shaft 29 via the increase-speed mechanism 40 (namely, via the sun gear 41, the small pinion gears 42, the large pinion gears 43 and the sun gear 44). The relationship between the number of rotations ($\omega'$) of the output shaft 29 and the number of rotations ($\omega$) of the input shaft 19 when such bypassing of the power occurs is expressed as below.

$$\omega' = \frac{N1}{N2} \cdot \frac{N3}{N4} \cdot \omega \qquad \text{[Expression 2]}$$

Thus, the number of rotations ($\omega'$) of the output shaft 29 becomes larger than the number of rotations ($\omega$) of the input shaft 19, namely resulting in $\omega'>\omega$.

In addition, in a case where the condition of the change-speed apparatus C is changed from the increase-speed condition to the direct-coupled condition again, when the electromagnetic actuator E is switched OFF, the movable element 46 moves forward by virtue of the biasing force of the coned disc spring 48. As this occurs, since the movable element 46 moves forward together with the pressing portion Ep of the electromagnetic actuator E, the change-speed clutch 50 moves forward while being kept in friction engagement. Then, when the protruding portion 33 of the movable element 46 approaches the circlip 31 of the input shaft 19, the biasing force of the coned disc spring 48 starts to be transmitted to the direct coupling clutch 30, and the pressing portion Ep starts to move apart from the change-speed clutch 50. Namely, as shown in FIG. 5, as the direct coupling clutch pressing force gets stronger, the change-speed clutch pressing force gets weaker. Then, when the biasing force of the coned disc spring 48 has been completely received by the circlip 31 of the input shaft 19 via the direct coupling clutch 30, the direct coupling clutch 30 is switched ON.

Here, when the biasing force of the coned disc spring 48 is gradually transmitted to the direct coupling clutch 30 while the friction engagement of the change-speed clutch 50 is gradually released the movable element 46 starts to rotate together with the input shaft 19. Then, the changeover clutch discs 53 of the change-speed clutch 50 start to rotate in conjunction with the rotation of the movable element 46. When the pressing portion Ep of the electromagnetic actuator E moves apart from the change-speed clutch 50 and the front end of the change-speed clutch 50 is opened, the respective clutch discs 52 and changeover clutch discs 53 move forward gradually in conjunction with the rotation of the changeover clutch discs 53. Then, when the direct coupling clutch 30 is brought into complete friction engagement to thereby be switched ON a predetermined clearance is secured between the clutch discs 52 and the changeover clutch discs 53 of the change-speed clutch 50, respectively, whereby the change-speed clutch 50 is switched OFF.

Thus, changing over the condition of the change-speed apparatus C from the direct-coupled condition to the increase-speed condition or from the increase-speed condition to the direct-coupled condition is executed by the gradual continuous switching ON and OFF of the direct coupling clutch 30 or the change-speed clutch 50. Consequently, it follows that the rotating speeds of the rear wheels fluctuate continuously by changing over the conditions of the change-speed apparatus C.

Figure 6A:
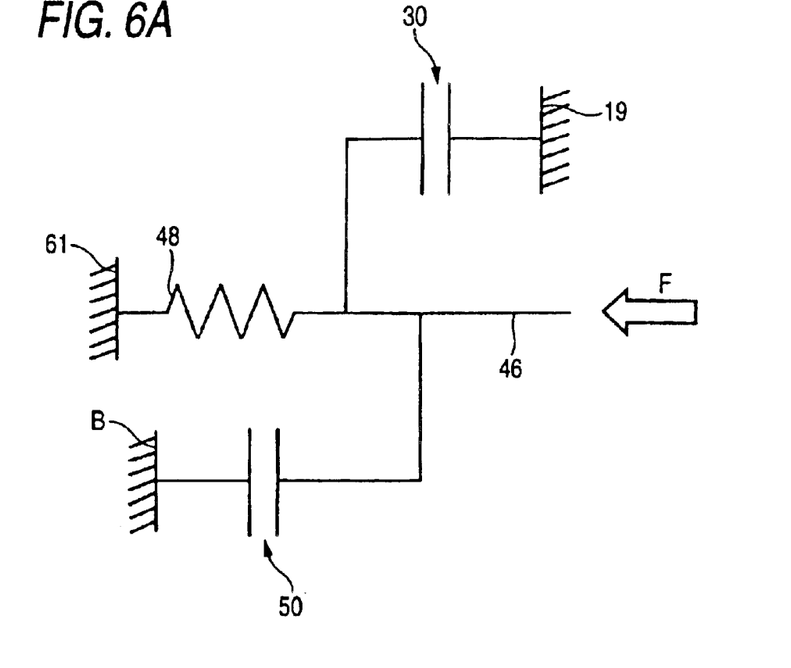
FIG. 6A is a view showing a construction in a diagrammatic fashion in which after the engagement of a direct coupling clutch is released, a change-speed clutch is brought into engagement.
Figure 6B:
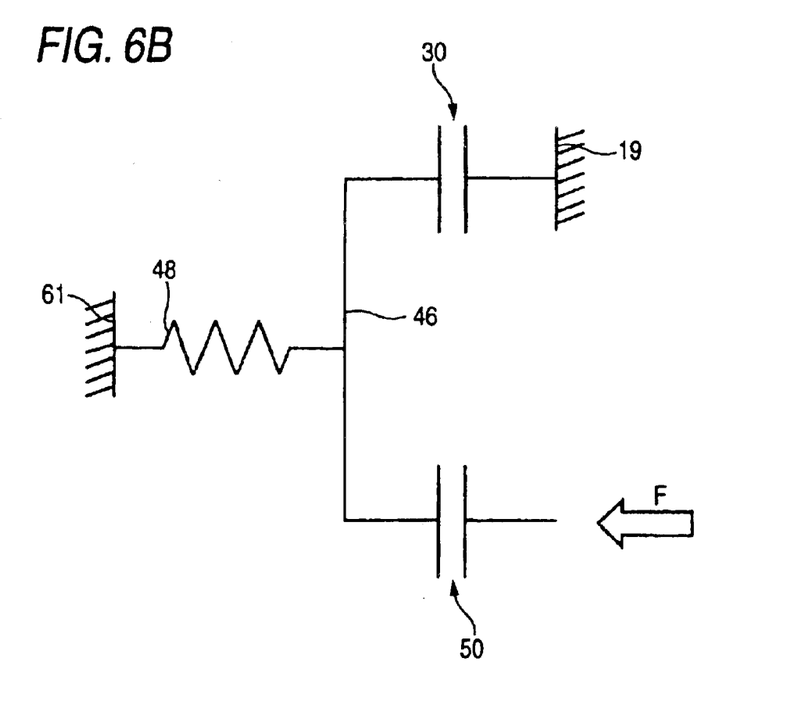
FIG. 6B is a view showing in a schematic fashion a construction according to the invention in which as the change-speed clutch is released, the engagement of the direct coupling clutch is released.

Here, the thrust of the electromagnetic actuator E will be described with the upper limit value of the biasing force of the coned disc spring 48 being 100 and a force required for the complete friction engagement of the change-speed clutch 50 being 50. As shown in FIG. 6A, in a construction in which the change-speed clutch 50 is pressed against the casing B via the circlip or the like for engagement after the engagement of the direct-coupling clutch 30 has been released, in order to release the engagement of the direct coupling clutch 30, after the electromagnetic actuator E has contracted the coned disc spring 48 with a thrust of 100, the electromagnetic actuator E still requires a thrust of 50 in order to bring the change-speed clutch 50 into engagement. Namely, in this construction, the thrust of the electromagnetic actuator E needs to be made 150. In contrast, as shown in FIG. 6B, in a construction like one according to the first embodiment in which the engagement of the direct coupling clutch 30 is released gradually while bringing the change-speed clutch 50 into engagement, since the engagement of the change-speed clutch 50 is attained by the biasing force of the coned disc spring 48 and the thrust of the electromagnetic actuator E, it follows that the thrust of the electromagnetic actuator E will be sufficient in the event that the thrust of the actuator E is equal to the upper limit value of the basing force of the coned disc spring 48, which is 100.

Next, operations of the front and rear wheels drive system in various running conditions of the vehicle will be described.

For example, when the vehicle is running at high speeds, in the event that the electromagnetic actuator E is in the OFF condition based upon information on the vehicle speeds and steer angles of the steering wheel, the change-speed apparatus C is put in the direct-coupled condition, whereby the front and rear wheels are allowed to rotate at the same speed. In addition, when rounding a predetermined bend in the high-speed running condition the electromagnetic actuator E is switched ON and the change-speed apparatus C is put in the increase-speed condition, and the drive torque of the inner rear wheel is made larger than the drive torque of the outer rear wheel by controlling the hydraulic multi-plate clutches 21, 25 of the rear-wheel side differential 13 with a hydraulic pressure control device or the like which is not shown.

Furthermore, for example, when the vehicle turns a small bend at low or intermediate speeds the electromagnetic actuator E is switched ON and the change-speed apparatus C is put in the increase-speed condition, and the drive torque of the outer rear wheel is made larger than the drive torque of the inner rear wheel by controlling the hydraulic multi-plate clutches 21, 25 of the rear-wheel side differential 13 with the hydraulic pressure control device or the like which is not shown.

According to the construction of the first embodiment, the following advantages can be obtained.

Since with the direct coupling clutch 30 being kept normally ON by the coned disc spring 48, the change-speed clutch 50 is switched ON while the direct coupling clutch 30 is switched OFF by the electromagnetic actuator E, changing over the clutches can be implemented by the single actuator, whereby the vehicle front and rear wheels drive system can be made small in size and light in weight. In addition, since the friction engagement of the change-speed clutch 50 is executed by the biasing force of the coned disc spring 48 and the thrust of the electromagnetic actuator E, the thrust of the electromagnetic actuator E may be set substantially equal to or slightly larger than the upper limit value of the biasing force of the coned disc spring 48. Owing to this, an electromagnetic actuator which is small in size and light in weight can be used as the electromagnetic actuator E. Furthermore, when changing over the condition of the change-speed apparatus C from the direct-coupled condition to the increase-speed condition or from the increase-speed condition to the direct-coupled condition the direct coupling clutch 30 and the change-speed clutch 50 are switched ON and OFF continuously, and therefore, since there exists no time when both the clutches are completely switched OFF and no drive torque is transmitted, it is possible to avoid a risk that shock and noise are generated by connection and disconnection of drive torque while running.

Also in the control device for controlling the electromagnetic actuator E, the number of items to be controlled is reduced lower than that of the prior art examples, whereby the control rules or fail safe programs can be made simpler.

In addition, even with the vehicle front and rear wheels drive system M according to the first embodiment, as with the similar conventional systems, it is possible to obtain various advantages that the stability in rounding a bend at high speed can be improved and that the tight corner braking phenomenon in running at low to intermediate speeds can be prevented without damaging the merits of the 4WD vehicles by controlling the change-speed apparatus C and the rear wheel side differential 13.

Furthermore, since the pressing portion Ep of the electromagnetic actuator E presses against the clutch discs 52 of the change-speed clutch 50 which does not rotate at all times, there is no need to provide bearings which have to be provided to press against those which rotate, and therefore the size of the apparatus can be reduced to that extent, and vibrations and noise can also be prevented.

Next, a description will be given of a second embodiment of the invention.

Figure 7:
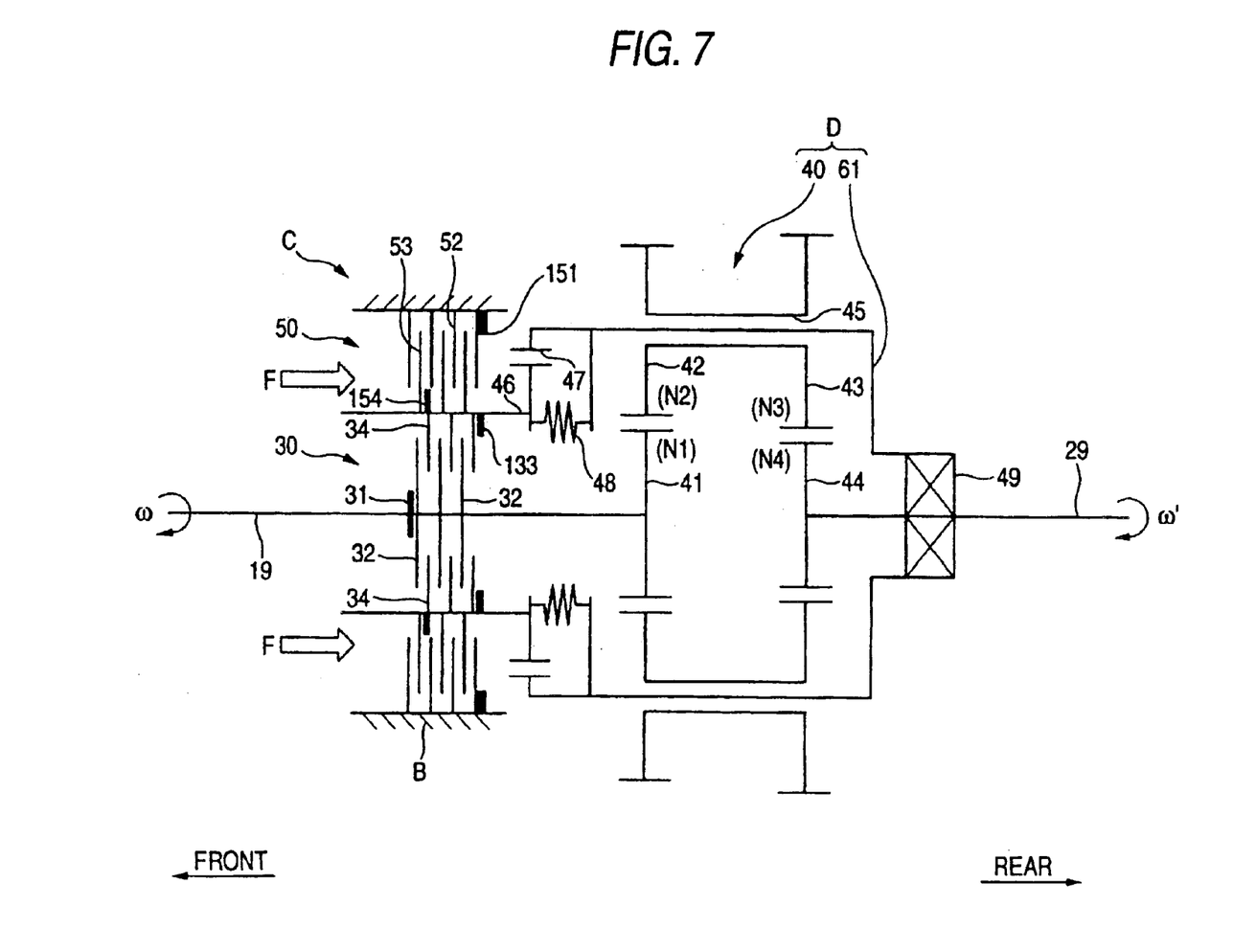
FIG. 7 is a view showing in a diagrammatic fashion the construction of a change-speed apparatus according to a second embodiment of the invention.

As shown in FIG. 7, the second embodiment is different from the first embodiment in the regulating structure of the clutch discs 32 and the changeover clutch discs 34, the regulating structure of the clutch disc 52 and the change over clutch discs 53. Specifically, the clutch discs 32 and the changeover clutch discs 34 are disposed alternately in the longitudinal direction, and the longitudinal movements of the clutches are regulated by a circlip 31 fixed to the input shaft 19 and a circlip 133 which is fixed to the movable element 46. Further, rearward movements of the single changeover clutch disc 53 and the single clutch disc 52 of those clutch discs which are situated at the front of the change-speed clutch 50 are regulated by a circlip 154 fixed to the movable element 46, and rearward movements of the remaining changeover clutch discs 53 and clutch discs 52 are regulated by the circlip 154 and a circlip 151 fixed to the casing B. Therefore, like reference numerals are imparted to like constituent components to the first embodiment, and the detailed explanations of them are omitted.

The operation (clutch changeover method) of the change-speed apparatus C in the vehicle front and rear wheels drive system M of the second embodiment will be described.

With the electromagnetic actuator of the change-speed apparatus C being switched OFF, since there is generated from the electromagnetic actuator no thrust which is directed to a direction indicated by arrows F in FIG. 7, no pressure is applied to the change-speed clutch 50 and there is generated no restraining force between the casing B and the movable element 46. On the other hand, a biasing force directed forward is imparted to the movable element 46 by the coned disc spring 48 and this moves the movable element 46 forward. When the movable element 46 moves forward the circlip 133 on the movable element 46 pushes forward the changeover clutch discs 34 and the clutch discs 32 of the direct coupling clutch 30. Since the input shaft 19 receives via the circlip 31 a biasing force transmitted in this way, the direct coupling clutch 30 is switched ON. As this occurs, the single changeover clutch disc 53 and the single clutch disc 52 which are situated at the front end of the change-speed clutch 50 move forward via the circlip 154 owing to the biasing force from the coned disc spring 48. The change-speed clutch 50 is switched OFF by setting clearances of the respective portions to predetermined values such that the change-speed clutch 50 is switched OFF in this state.

Thus, when the direct coupling clutch 30 is switched ON the movable element 46 is fixed to the input shaft 19, while when the change-speed clutch 50 is switched OFF the movable element 46 becomes unfixed to the casing B, and therefore, the input shaft 19 and the movable element 46 rotate together. In addition, since the movable element 46 and the carrier 61 are prevented from rotating relative to each other by the internal gear 47, they also rotate together. In the event that the rotating direction of the input shaft 19 is in the advancing direction, the clutch of the one-way clutch 49 provided at the rear end of the carrier 61 is brought into engagement, whereby the output shaft 29 rotates. Therefore, in the event that the vehicle is moved forward, since the input shaft 19, the movable element 46, the carrier 61 and the output shaft 29 rotate together, the number of rotations ($\omega'$) of the output shaft 29 becomes equal to the number of rotation ($\omega$) of the input shaft 19. Namely, when the vehicle is advanced the assistance in transmitting the torque from the input shaft 19 to the output shaft 29 is rendered by the movable element 46, the carrier 61 and the one-way clutch 49, the relationship between the numbers of rotations of the shafts becoming $\omega=\omega'$.

In contrast, with the electromagnetic actuator being switched ON, since a thrust is generated from the electromagnetic actuator in a direction indicated by arrows F in FIG. 7, the single clutch disc 52 and the single changeover clutch disc 53 which are situated at the front end of the change-speed clutch 50 move rearwards. Since the circlip 154 is pushed rearwards by the movement of the clutch disc 52 and the changeover clutch disc 53, the movable element 46 is pushed rearwards against the biasing force of the coned disc spring 48. As this occurs, since the biasing force of the coned disc spring 48 is received by the thrust of the movable element 46, the friction engagement of the changeover clutch discs 34 and clutch discs 32, respectively, of the direct coupling clutch 30 is released, whereby the direct coupling clutch 30 is switched OFF. Namely, there exists no restraining force between the movable element 46 and the input shaft 19. Thereafter, when a thrust which is equal to or larger than the biasing force of the coned disc spring 48 is imparted by the electromagnetic actuator, a difference between the biasing force and the imparted thrust (the thrust of the actuator—the biasing force of the coned disc spring) is then received by the circlip 151 of the casing B via the clutch discs 52 and the changeover clutch discs 53. Namely, the change-speed clutch 50 is switched ON, and the movable element 46 is fixed to the casing B.

Thus, when the direct coupling clutch 30 is switched OFF the input shaft 19 is allowed to rotate independently from the movable element 46. In addition, when the change-speed clutch 50 is switched ON the movable element that is then rotating is fixed to the casing that is fixed in turn to the vehicle body, whereby the rotation of the carrier 61 is halted. The power transmission then is performed by bypassing the power from the input shaft 19 to the output shaft 29 via the increase-speed 40 (namely, via the sun gear 41, the small pinion gears 42, the large pinion gears 43 and the sun gear 44). The relationship between the number of rotations ($\omega'$) of the output shaft 29 and the number of rotations ($\omega$) of the input shaft 19 when such bypassing of the power occurs is expressed in the Expression 2 shown in the first embodiment.

Thus, the number of rotations ($\omega'$) of the output shaft 29 becomes larger than the number of rotations ($\omega$) of the input shaft 19, namely resulting in $\omega'>\omega$.

Here, the thrust of the electromagnetic actuator will be described with the upper limit value of the biasing force of the coned disc spring 48 being 100 and a force required for the complete friction engagement of the change-speed clutch 50 being 50. As shown in FIG. 6A, in a construction according the second embodiment in which the change-speed clutch 50 is pressed against the casing B via the circlip or the like for engagement after the engagement of the direct-coupling clutch 30 has been released, in order to release the engagement of the direct coupling clutch 30, after the electromagnetic actuator has contracted the coned disc spring 48 with a thrust of 100, the electromagnetic actuator still requires a thrust of 50 in order to bring the change-speed clutch 50 into engagement. Namely, in this case, the thrust of the electromagnetic actuator according to the second embodiment may be set to 150.

Next, operations of the front and rear wheels drive system in various running conditions of the vehicle will be described.

For example, when the vehicle is running at high speeds, in the event that the electromagnetic actuator E is in the OFF condition based upon information on the vehicle speeds and steer angles of the steering wheel, the change-speed apparatus C is put in the direct-coupled condition, whereby the front and rear wheels are allowed to rotate at the same speed.

In addition, when rounding a predetermined bend in the high-speed running condition the electromagnetic actuator is switched ON and the change-speed apparatus C is put in the increase-speed condition, and the drive torque of the inner rear wheel is made larger than the drive torque of the outer rear wheel by controlling the hydraulic multi-plate clutches 21, 25 of the rear-wheel side differential 13 with a hydraulic pressure control device or the like which is not shown. Furthermore, for example, when the vehicle turns a small bend at low or intermediate speeds the electromagnetic actuator is switched ON and the change-speed apparatus C is put in the increase-speed condition, and the drive torque of the outer rear wheel is made larger than the drive torque of the inner rear wheel by controlling the hydraulic multi-plate clutches 21, 25 of the rear-wheel side differential 13 with the hydraulic pressure control device or the like which is not shown.

According to the construction of the second embodiment, the following advantages can be obtained.

Since with the direct coupling clutch 30 being kept normally ON by the coned disc spring 48, the change-speed clutch 50 is switched ON after the direct coupling clutch 30 has been switched OFF by the electromagnetic actuator, changing over the clutches can be implemented by the single actuator, whereby the vehicle front and rear wheels drive system can be made small in size and light in weight.

Also in the control device for controlling the electromagnetic actuator, the number of items to be controlled is reduced lower than that of the prior art examples, whereby the control rules or fail safe programs can be made simpler.

Furthermore, even with the vehicle front and rear wheels drive system M according to the second embodiment, as with the similar conventional systems, it is possible to obtain various advantages that the stability in rounding a bend at high speeds can be improved and that the tight corner braking phenomenon in running at low to intermediate speeds can be prevented without damaging the merits of the 4WD vehicles by controlling the change-speed apparatus C and the rear wheel side differential 13.

Thus, the invention is not limited to the embodiment that has been described heretofore but may be embodied in various forms.

While the electromagnetic actuator E is adopted as a power source for changing over the direct coupling clutch 30 and the change-speed clutch 50 in the embodiment, the invention is not limited thereto. For example, actuators in any form such as those utilizing hydraulic pressures or electric motors can be adopted.

While the construction is adopted in the embodiment in which the direct coupling clutch 30 is kept in the normally engaged condition using the forward biasing force of the coned disc spring 48, and in which the engagement of the change-speed clutch 50 and the engagement of the direct coupling clutch 30 are released using the rearward thrust of the electromagnetic actuator E, the invention is not limited thereto. For example, the change-speed clutch 50 may be kept in the normally engaged condition by the coned disc spring 48 via the movable element 46, and the engagement of the direct coupling clutch 30 and the engagement of the change-speed clutch 50 may be released by the electromagnetic actuator E. Then, in the first embodiment, an additional circlip needs to be fixed to the casing B and the circlip 31 of the input shaft 19 has to be removed. In addition, the positions of the coned disc spring 48 and the electromagnetic actuator E may be reversed; and the longitudinal positional relationships between the circlips 31, 54 and the clutch discs 32, 34, 53, 52 of the protruding portion 33, respectively (in the second embodiment, the longitudinal positional relationships of the clutch discs 32, 34, 53, 52 with respect to the circlips 31, 133, 154, 151), may be reversed. In this construction, the direct coupling clutch 30 is kept in the normally engaged condition by biasing the movable element 46 rearwards with the coned disc spring 48, and the engagement of the change-speed clutch 50 and the engagement of the direct coupling clutch 30 are released by virtue of a forward thrust that is generated by the electromagnetic actuator E.

In addition, the positional relationships of the increase-speed mechanism 40, the direct coupling clutch 30, the change-speed clutch 50 and the one-way clutch 49 is not limited to the positional relationships illustrated in the embodiment, but those component parts may be disposed in any positional relationships. For example, the one-way clutch 49 may be disposed on the input shaft 19 side, and the change-speed clutch 50 and the direct coupling clutch 30 maybe disposed on the output shaft 29 side.

Since the one-way clutch 49 is provided in order to assist the torque transmission when the rotating direction of the input shaft 19 is in the advancing direction, even in the event that this one-way clutch 49 is eliminated, there is caused no damage to the function of the change-speed apparatus C, and in a case where no assistance in transmitting the torque is required, the one-way clutch 49 may be eliminated.

Figure 8:
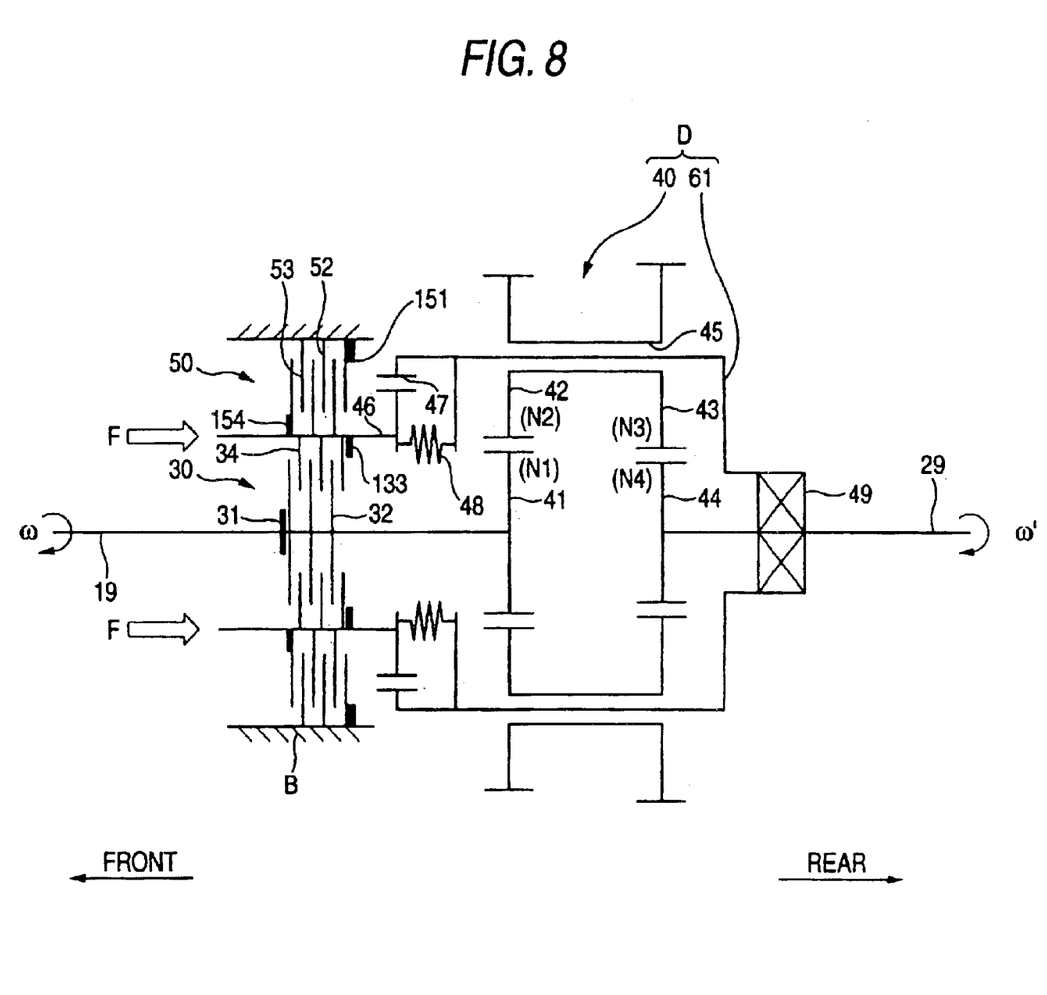
FIG. 8 is a view showing in a diagrammatic fashion the construction of a modified example of the change-speed apparatus according to the second embodiment of the invention.

While the construction is adopted in the second embodiment in which the movable element 46 is moved by the electromagnetic actuator via the single clutch disc 52 and the single changeover clutch disc 53, the invention is not limited thereto, and any construction may be adopted provided that the movable element 46 is moved against the biasing force of the elastic body by virtue of the thrust of the electromagnetic actuator. For example, as shown in FIG. 8, a construction may be adopted in which the movable element 46 is moved directly by virtue of the thrust of the actuator by positioning the circlip 154 in front of the changeover clutch disc 53 at the front end. However, in the construction according to the embodiment in which a thrust is imparted to the clutch disc 52 which is designed not to rotate at all times so as to move the movable element 46 via the change over clutch disc 53 and the circlip 154, there is no teed to directly impart the trust of the actuator to the movable element 46 which is rotating. Consequently, there is no need to provide a bearing or the like between the rotating movable element 46 and the actuator, whereby the construction can be made compact to that extent, and the generation of vibrations and noise can also be prevented.

While the circlip 54 of the first embodiment is made to act as the regulating means for regulating the movements of the respective clutch discs 53, 52 by being fixed to the movable element 46, and the circlips 133, 154, 151 are made to act as the regulating means for regulating the movements of the respective clutch discs 34, 53, 52 by being fixed to the movable element 46 and the casing B, the invention is not limited thereto. For example, in the first embodiment, the movements of the respective clutch discs 53, 52 may be regulated by integrally forming a protruding portion on the movable element 46 at the position where the circlip 54 is fixed. In the second embodiment, the movements of the respective clutch discs 34, 53, 52 may be regulated by integrally forming a protruding portion on the movable element 46 and the casing B at the positions where the circlips 133, 154, 151 are fixed.

In addition, any number of clutch discs 32, 34, 53, 52 may be provided. For example, only a single clutch disc maybe provided for those clutch discs, respectively. Thus, in the event that such a construction is adopted in which only a single clutch disc is provided for the clutch discs 32, 34, 53, 52, respectively, even if the respective clutch discs except the clutch discs of the change-speed clutch are fixed to the input shaft and the movable element in such a manner as not to slide in the longitudinal directions, the function and effectiveness provided by the embodiment can be provided.

While the biasing force generated by keeping the coned disc spring 48 in the normally contracted condition is used in this embodiment, a biasing force may be used which is generated by keeping a coil spring or the like in a normally expanded condition.

According to the first aspect of the invention, since the utilization of the elastic body attains the changeover of the clutches by the single actuator, the vehicle front and rear wheels drive system cay be made small in size and light in weight. In addition, since when, for example, the actuator is actuated the change-speed clutch is gradually brought into engagement, while the engagement of the direct coupling clutch is gradually released, there is no risk that the transmission of power is broken, and therefore, there is no risk that shocks are felt when shifting gears.

According to the second aspect of the invention, in addition to the advantage provided by the first aspect of the invention, since the respective changeover clutch discs are disposed in two stages in the radial direction, the change-speed apparatus can be made small in size in the axial direction of the input shaft or the like.

According to the third aspect of the invention, since. changing over the clutch can be attained with the single actuator by utilizing the elastic body, for example, a sub transmission for the transmission of an FR vehicle can be made small in size and light in weight.

What is claimed is:

1. A clutch changeover method for changing over speed-changeable clutches in a change-speed apparatus having a direct coupling clutch and a speed-up or speed-down clutch which are disposed on a movable element which is movable along an axial direction of an input shaft or an output shaft and is meshed with a carrier of a composite planetary gear device in such a manner as not to rotate relative to said carrier and is provided concentrically with said input shaft or said output shaft of a power transmission path of a speed-changeable clutch with the composite planetary gear device, said movable element being adapted to move along an axial direction of said input shaft or said output shaft, and an elastic body and an actuator both for changing over a state between engagement and disengagement of said direct coupling clutch or said speed-up or speed-down clutch, said elastic body and said actuator being disposed such that operating directions of said elastic body and said actuator are opposed to each other in the axial direction, said clutch changeover method comprising the steps of:

keeping one of said direct coupling clutch and said speed-up or speed-down clutch in engagement by normally moving said movable element in one direction by virtue of a biasing force of said elastic body; and changing over the engagement of said clutches from said one clutch to the other clutch by moving said movable element against the biasing force of said elastic body by activating said actuator.

2. The clutch changeover method according to claim 1, wherein one of said direct coupling clutch and said speed-up or speed-down clutch is kept in engagement by normally moving said movable element in one direction by virtue of a biasing force of said elastic body, and wherein the engagement of said one clutch is released by moving said movable element against the biasing force of said elastic body while bringing the other clutch into engagement by activating said actuator.

3. The clutch changeover method according to claim 1, wherein one of said direct coupling clutch and said speed-up or speed-down clutch is kept in engagement by normally moving said movable element in one direction by virtue of a biasing force of said elastic body, and wherein said other clutch is brought into engagement after the engagement of said one clutch has been released by moving said movable element in the other direction against the biasing force of said elastic body by actuating said actuator.

4. A clutch changeover method for a vehicle front and rear wheels drive system having a speed-changeable change-speed apparatus disposed along a power transmission path extended from primary drive wheels to secondary drive wheels, said change-speed apparatus having a composite planetary gear device provided in a casing fixed to a vehicle body, comprising the steps of:

preparing changeover clutch discs for, respectively, a direct coupling clutch and a speed-up or speed-down clutch disposed on a moveable element provided concentrically with an input shaft or an output shalt of said change-speed apparatus to which power is transmitted from said primary drive wheels, said movable element being adapted to move along an axial direction of said input shaft or said output shaft and meshing with a carrier of said composite planetary gear device in such a manner as not to rotate relative to said carrier;

preparing as elastic body and an actuator both for changing over a state between engagement and disengagement of said direct coupling clutch or said speed-up or speed-down clutch, said elastic body and said actuator being disposed such that operating directions of said elastic body and said actuator are opposed to each other in the axial direction;

moving said movable element by virtue of a biasing force thereof; and bringing one of said direct coupling clutch or said speed-up or speed-down clutch into engagement by said elastic body, wherein said actuator includes a changeable change-speed apparatus which changes over the engagement of said clutches from the engagement of said one clutch to the engagement of the other clutch by moving said moveable element against the biasing force of said elastic body by virtue of a thrust of the actuator.

* * * * *